United States Patent
Yanatsubo et al.

(10) Patent No.: US 10,214,106 B2
(45) Date of Patent: Feb. 26, 2019

(54) DRIVING ASSISTANCE APPARATUS

(71) Applicant: TOYOTA JIDOSHA KABUSHIKI KAISHA, Toyota-shi, Aichi-ken (JP)

(72) Inventors: Takashi Yanatsubo, Toyota (JP); Hisashi Fujiwara, Nagoya (JP); Yosuke Nihei, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 14 days.

(21) Appl. No.: 15/337,509

(22) Filed: Oct. 28, 2016

(65) Prior Publication Data
US 2017/0144545 A1    May 25, 2017

(30) Foreign Application Priority Data

Nov. 20, 2015  (JP) ................. 2015-228008

(51) Int. Cl.
| | | |
|---|---|---|
| *B60K 35/00* | (2006.01) | |
| *G06F 3/14* | (2006.01) | |
| *G06K 9/00* | (2006.01) | |
| *H04N 7/18* | (2006.01) | |

(52) U.S. Cl.
CPC .......... *B60K 35/00* (2013.01); *G06F 3/14* (2013.01); *G06K 9/00798* (2013.01); *G06K 9/00818* (2013.01); *H04N 7/183* (2013.01); *B60K 2350/1096* (2013.01); *B60K 2350/352* (2013.01); *G09G 2380/10* (2013.01)

(58) Field of Classification Search
None
See application file for complete search history.

(56) References Cited

U.S. PATENT DOCUMENTS

| | | | | |
|---|---|---|---|---|
| 2008/0079753 | A1* | 4/2008 | Victor ................ | B62D 15/029 345/660 |
| 2015/0251538 | A1* | 9/2015 | Tamura ................ | B60K 35/00 340/461 |
| 2016/0006922 | A1* | 1/2016 | Boudreau .......... | H04N 5/23206 348/207.1 |

FOREIGN PATENT DOCUMENTS

| | | |
|---|---|---|
| CN | 104428171 A | 3/2015 |
| JP | 2005-128790 A | 5/2005 |
| JP | 2010-030331 A | 2/2010 |
| JP | 2010-205160 A | 9/2010 |

* cited by examiner

*Primary Examiner* — Edward Martello
(74) *Attorney, Agent, or Firm* — Oliff PLC

(57) ABSTRACT

A driving assistance apparatus which is mounted in a vehicle includes an acquisition unit configured to acquire external information, a notification request generation unit configured to generate a notification request based on the external information, a switching unit configured to switch between an on state and an off state of a notification function according to an input from a vehicle occupant, a first information notification unit configured to display a first display for giving notification of the external information in a predetermined display area of a display device based on the notification request when the notification function is in the on state and the notification request is generated, and a second information notification unit configured to display a second display for giving notification of predetermined information different from the external information in the predetermined display area when the notification function is in the off state.

12 Claims, 12 Drawing Sheets

DRIVING ASSISTANCE APPARATUS

INCORPORATION BY REFERENCE

The disclosure of Japanese Patent Application No. 2015-228008 filed on Nov. 20, 2015 including the specification, drawings and abstract is incorporated herein by reference in its entirety.

BACKGROUND

1. Technical Field

The present disclosure relates to a driving assistance apparatus.

2. Description of Related Art

A notification function which acquires external information relating to road signs through a captured image of a camera and displays a display for giving notification of the acquired external information to a driver in a predetermined display area of a display device is known (for example, see Japanese Patent Application Publication No. 2010-205160 (JP 2010-205160 A)).

However, in the related art disclosed in JP 2010-205160 A, it is unclear whether or not a mechanism capable of turning off the notification function of the external information is provided, and there is a possibility that the notification function cannot be turned off. From this point, a display for giving notification of external information relating to attention attracting objects or road signs outside the vehicle causes some vehicle occupants (for example, drivers) to feel bothered and provides unnecessary information to the vehicle occupants (for example, drivers). This is because display is performed based on attention attracting objects or road signs outside the vehicle, and thus the display is turned on or off (regardless of a driver's intention). For this reason, it is useful that the notification function can be selectively turned on/off according to an input from a vehicle occupant.

On the other hand, in a configuration in which no new information is provided through the predetermined display area when the notification function is in the off state, since the predetermined display area becomes a dead space, there is room for improvement from a viewpoint of performing efficient information provision to the vehicle occupants through a limited display area.

SUMMARY

Accordingly, the disclosure provides a driving assistance apparatus capable of performing new information provision to a vehicle occupant when a notification function is in an off state while enabling selectively to turn on/off the notification function according to an input from the vehicle occupant.

According to a first aspect of the disclosure, a driving assistance apparatus which is mounted in a vehicle includes a notification request generation unit configured to generate a notification request based on external information relating to attention attracting objects or road signs outside the vehicle, a switching unit configured to switch between an on state and an off state of a notification function according to an input from a vehicle occupant, a first information notification unit configured to display a first display for giving notification of the external information in a predetermined display area of a display device based on the notification request in a case where the notification function is in the on state and the notification request is generated, and a second information notification unit configured to display a second display for giving notification of predetermined information different from the external information in the predetermined display area in a case where the notification function is in the off state.

In the first aspect of the disclosure, the switching unit configured to switch between the on state and the off state of the notification function according to the input from the vehicle occupant is provided. With this, the notification function can be selectively turned on/off according to the input from the vehicle occupant. The first information notification unit displays the first display for giving notification of the external information relating to the attention attracting objects or the road signs outside the vehicle in the predetermined display area of the display device based on the notification request in a case where the notification function is in the on state and the notification request is generated. With this, when the notification function is in the on state, the first display based on the notification request can be displayed through the predetermined display area. On the other hand, the second information notification unit displays the second display for giving notification of the predetermined information different from the external information in the predetermined display area in a case where the notification function is in the off state. With this, it is possible to perform provision (new information provision) of the predetermined information according to the second display to the vehicle occupant when the notification function is in the off state.

In the driving assistance apparatus, the notification function may be a road sign assist function.

In the driving assistance apparatus, the notification request generation unit may determine whether or not notification request generation conditions are satisfied based on image data. The notification request generation conditions may be satisfied in a case where any one of i) and ii) is satisfied: i) a predetermined road sign to be notified is recognized based on image data, and ii) notification request end conditions are not satisfied after the predetermined road sign to be notified has been recognized.

In the driving assistance apparatus, the notification request end conditions may be satisfied in a case where any one of conditions i) to v) is satisfied: i) a road on which a host vehicle is traveling is changed from a road in which a predetermined road sign to be notified has been recognized, ii) a predetermined time has elapsed after the predetermined road sign to be notified has been recognized, iii) the host vehicle travels a predetermined distance after the predetermined road sign to be notified has been recognized, iv) the host vehicle changes a lane from a lane in which the predetermined road sign to be notified has been recognized, and v) another new predetermined road sign to be notified is recognized.

The driving assistance apparatus may further include a third information notification unit configured to display an adjustable speed limiter function being in an on state in the predetermined display area of the display device.

The driving assistance apparatus may further include a meter electronic control unit and a road sign assist electronic control unit.

In the driving assistance apparatus, the notification request generation unit may determine whether or not notification request generation conditions are satisfied. The notification request generation conditions may be satisfied in a case where any one of i) and ii) is satisfied: i) an attention attracting object information acquisition unit acquires attention attracting object information through a communication device, and ii) notification request end conditions are not satisfied after the attention attracting object information has been acquired.

In the driving assistance apparatus, the notification request end conditions may be that the vehicle passes through a position of the attention attracting object indicated by the attention attracting object information.

The driving assistance apparatus may further include a third information notification unit configured to display a constant display function being in an on state in the predetermined display area of the display device.

In the driving assistance apparatus, the constant display function may be a function of outputting display representing a traveling azimuth of the vehicle.

The driving assistance apparatus may further include a meter electronic control unit and a navigation electronic control unit.

According to the disclosure, a driving assistance apparatus capable of performing new information provision to a vehicle occupant when a notification function is in an off state while enabling selectively to turn on/off the notification function according to an input from the vehicle occupant is obtained.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
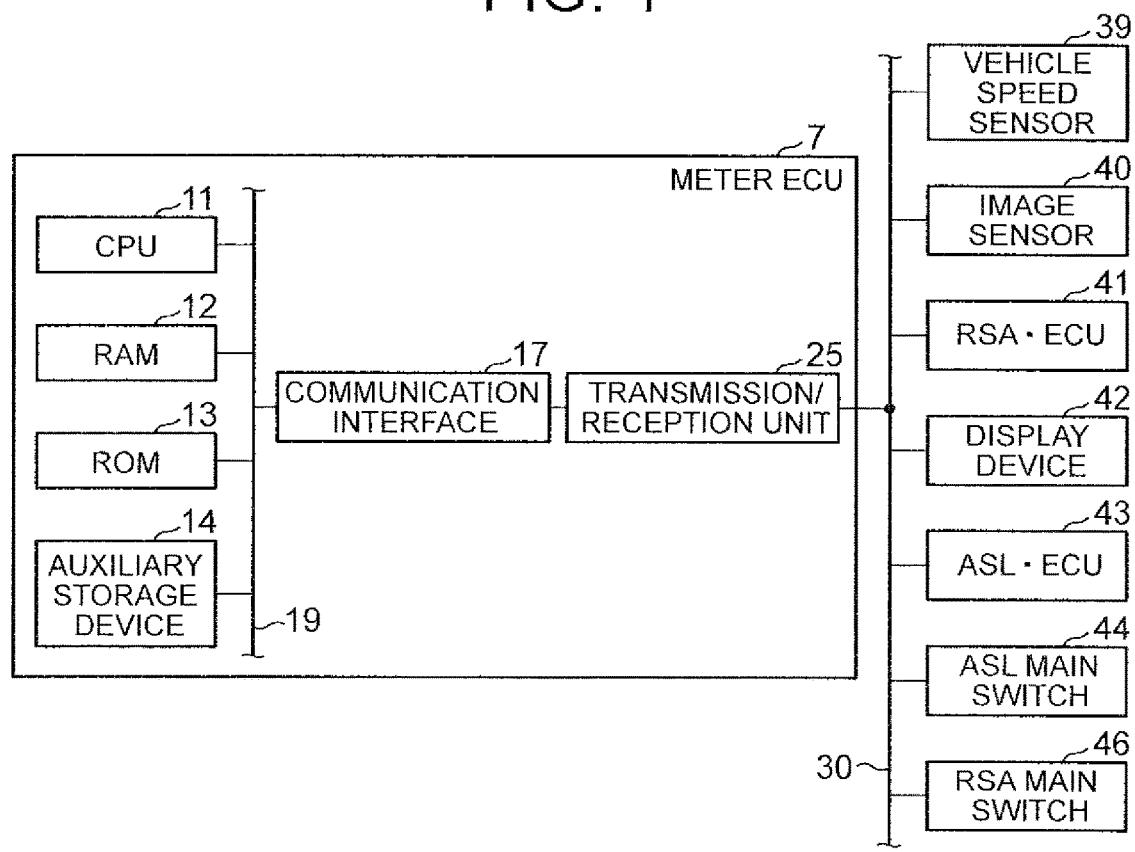
FIG. 1 is a diagram showing an example of a vehicle system which relates to a driving assistance apparatus.

Hereinafter, a best mode for carrying out the disclosure will be described referring to the drawings.

Example 1

FIG. 1 is a diagram showing an example of a vehicle system which relates to a driving assistance apparatus according to Example 1. In FIG. 1, a hardware configuration of a meter electronic control unit (ECU) 7 is also shown. In FIG. 1, the meter ECU 7 and a road sign assist (RSA) ECU 41 form a driving assistance apparatus.

The vehicle system is mounted in a vehicle and includes the meter ECU 7. The meter ECU 7, a vehicle speed sensor 39, an image sensor 40, the RSA ECU 41, a display device 42, an adjustable speed limiter (ASL) ECU 43, an ASL switch 44, an RSA switch 46, and the like are connected to a bus 30 (hereinafter, referred to as "CAN bus 30") based on a controller area network (CAN).

The meter ECU 7 controls display of the display device 42 in a meter disposed on an instrument panel. As shown in FIG. 1, the meter ECU 7 includes a central processing unit (CPU) 11, a random access memory (RAM) 12, a read only memory (ROM) 13, an auxiliary storage device 14, and a communication interface 17 connected through a bus 19, and a wired transmission/reception unit 25 connected to the communication interface 17. The RSA ECU 41 and the ASL ECU 43 also have the same hardware configuration.

The vehicle speed sensor 39 outputs an electrical signal according to a wheel speed.

The image sensor 40 is a camera which captures a scene in front of the vehicle.

The RSA ECU 41 operates when an RSA is in an on state. The details of the functions of the RSA ECU 41 will be described below. The RSA ECU 41 is realized by, for example, a computer which is integrated with the image sensor 40 to form a module.

The display device 42 is a display which is provided in the meter.

The ASL ECU 43 switches the on/off state of an ASL function according to an input from the ASL switch 44. In this example, the ASL ECU 43 sets an ASL flag to "1" when turning on the ASL function and sets the ASL flag to "0" when turning off the ASL function.

The ASL ECU 43 executes drive force limiting control for limiting the drive force of the host vehicle so as not to exceed a set upper limit vehicle speed when the ASL function is in the on state. For example, the ASL ECU 43 sets the upper limit vehicle speed based on image data obtained from the image sensor 40 or input information from a driver and calculates an upper limit acceleration to the upper limit vehicle speed based on the difference between a current vehicle speed and the upper limit vehicle speed. At this time, the upper limit acceleration is calculated based on the difference between the upper limit vehicle speed and the current vehicle speed as an acceleration such that the vehicle speed does not exceed the upper limit vehicle speed. The ASL ECU 43 calculates an upper limit drive force based on the upper limit acceleration and limits a required drive force according to a driver's operation on an acceleration pedal so as not to exceed the upper limit drive force.

The ASL switch 44 is operated by a vehicle occupant (driver or occupant). The ASL switch 44 is operated to an on position when turning on the ASL function and is operated to an off position when turning off the ASL function.

The RSA switch 46 is operated by the vehicle occupant. The RSA switch 46 is operated to an on position when turning on an RSA function and is operated to an off position when turning off the RSA function.

Figure 2:
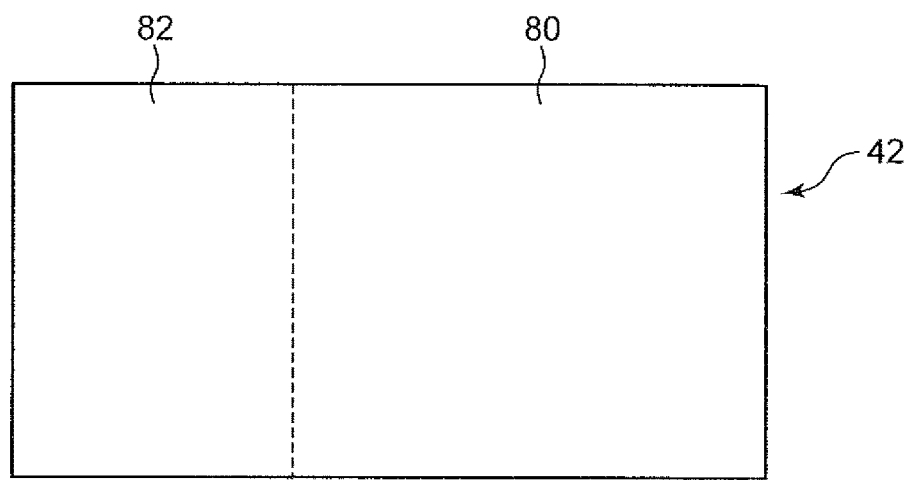
FIG. 2 is a diagram showing an example of a display area of a display device 42.

FIG. 2 is a diagram showing an example of a display area of the display device 42. As shown in FIG. 2, the display device 42 includes a main area 80 and an indicate area 82. A vertical dotted line shown in FIG. 2 schematically indicates a boundary line, and is not an actual display line.

Figure 3A:
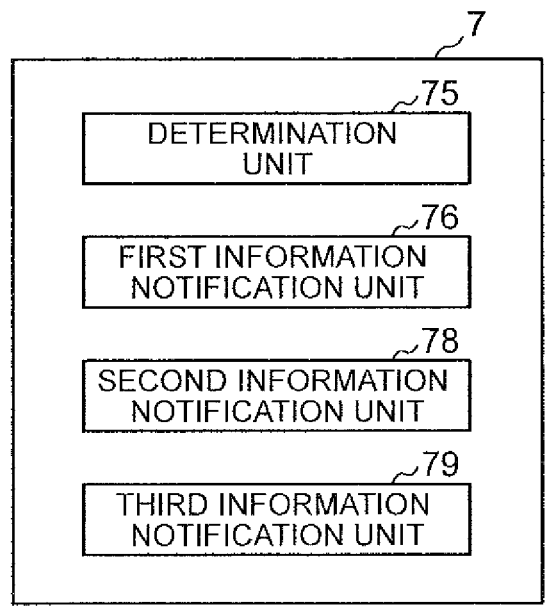
FIG. 3A is a functional block diagram of a meter ECU 7.
Figure 3B:
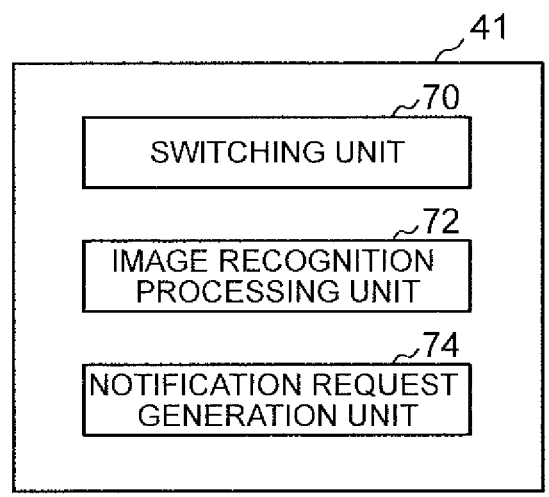
FIG. 3B is a functional block diagram of an RSA ECU 41.

FIG. 3A is a functional block diagram of the meter ECU 7. FIG. 3B is a functional block diagram of the RSA ECU 41.

As shown in FIG. 3A, the meter ECU 7 includes a determination unit 75, a first information notification unit 76, a second information notification unit 78, and a third information notification unit 79. The determination unit 75, the first information notification unit 76, the second information notification unit 78, and the third information notification unit 79 can be realized by the CPU 11 executing one or more programs in the ROM 13. The functions of the determination unit 75, the first information notification unit 76, the second information notification unit 78, and the third information notification unit 79 will be described below referring to FIG. 5.

As shown in FIG. 3B, the RSA ECU 41 includes a switching unit 70, an image recognition processing unit 72, and a notification request generation unit 74. The switching unit 70, the image recognition processing unit 72, and the notification request generation unit 74 can be realized by a CPU of the RSA ECU 41 executing one or more programs in a ROM.

The switching unit 70 switches the on/off state of the RSA function according to an input from the RSA switch 46. In this example, the switching unit 70 sets an RSA flag to "1" when turning on the RSA function and sets the RSA flag to "0" when turning off the RSA function.

The image recognition processing unit 72 recognizes (acquires) information (an example of external information) relating to a predetermined road sign to be notified through image recognition processing based on image data from the image sensor 40 when the RSA function is in the on state. The predetermined road sign includes, for example, a road sign indicating a limit speed, a road sign indicating an exit and an entrance of an expressway, a road sign indicating no passing, or the like.

The notification request generation unit 74 generates a notification request for giving notification of information by the RSA function based on a recognition result of the image recognition processing unit 72. A signal related to the notification request includes information representing a road sign recognized by the image recognition processing unit 72.

Figure 4:
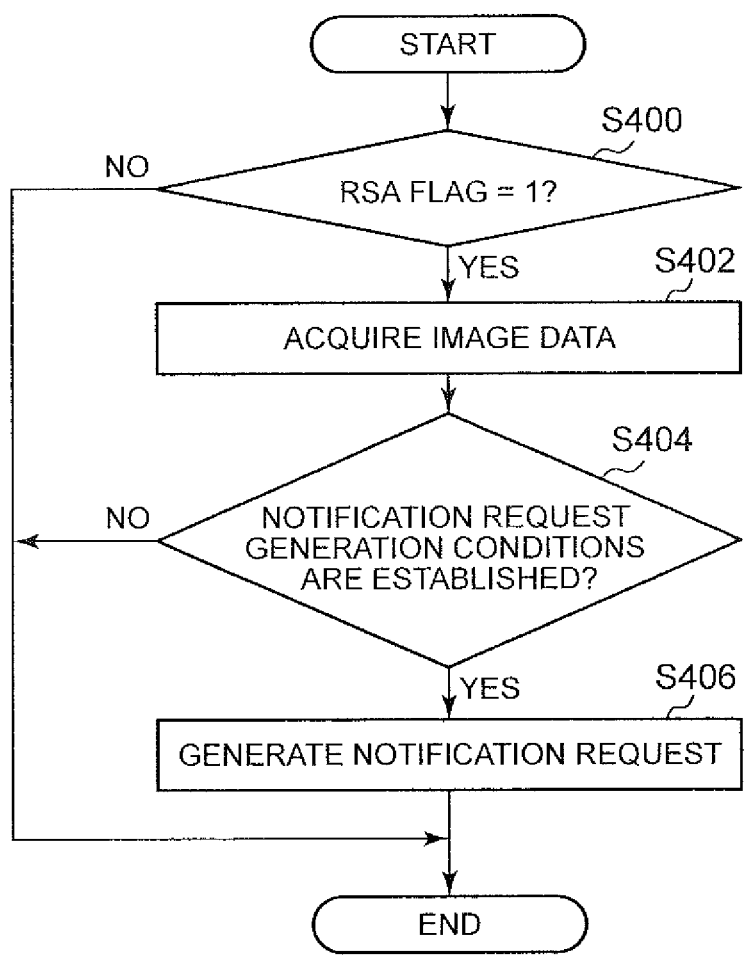
FIG. 4 is a flowchart schematically showing an example of the flow of an operation of the RSA ECU 41.

FIG. 4 is a flowchart schematically showing an example of the flow of an operation of the image recognition processing unit 72 and the notification request generation unit 74 of the RSA ECU 41. Processing shown in FIG. 4 is repeatedly executed at each predetermined period.

In Step S400, the image recognition processing unit 72 determines whether or not the RSA flag is "1". In a case where the determination result is "YES", the process progresses to Step S402, and otherwise, the process ends.

In Step S402, the image recognition processing unit 72 acquires image data from the image sensor 40 and supplies image data to the notification request generation unit 74.

In Step S404, the notification request generation unit 74 determines whether or not notification request generation conditions are satisfied based on image data. The notification request generation conditions are satisfied, for example, in a case where any one of (1) to (2) is satisfied: (1) the predetermined road sign to be notified is recognized based on image data, and (2) notification request end conditions are not satisfied after the predetermined road sign to be notified has been recognized (that is, after the condition (1) has been established). The notification request end conditions in the condition (2) are satisfied, for example, in a case where any one of conditions (11) to (15) is satisfied: (11) a road on which the host vehicle is traveling is changed from a road in which the predetermined road sign to be notified has been recognized (a road on which the host vehicle travels), (12) a predetermined time has elapsed after the predetermined road sign to be notified has been recognized, (13) the host vehicle travels a predetermined distance after the predetermined road sign to be notified has been recognized, (14) the host vehicle changes a lane from a lane in which the predetermined road sign to be notified has been recognized (a lane along which the host vehicle travels), and (15) another new predetermined road sign to be notified is recognized. As a situation in which the condition (11) is satisfied, for example, a case where the vehicle turns at an intersection, passes through a junction, enters an expressway from an ordinary road, or the like is assumed. The condition (14) is suitable in a case where the vehicle travels on a road on which a limit vehicle speed is different for each lane like Europe. Accordingly, the condition (14) may be omitted in a specification of a destination country where there is no road on which a limit speed is different for each lane. In a case where the condition (15) is satisfied, while the generation of a notification request related to previously recognized road signs ends, a notification request related to another new road sign is generated.

In Step S404, in a case where the determination result is "YES", the process progresses to Step S406, and otherwise, the process ends.

In Step S406, the notification request generation unit 74 generates a notification request for giving notification of information by the RSA function and passes the generated notification request to the CAN bus 30.

Figure 5:
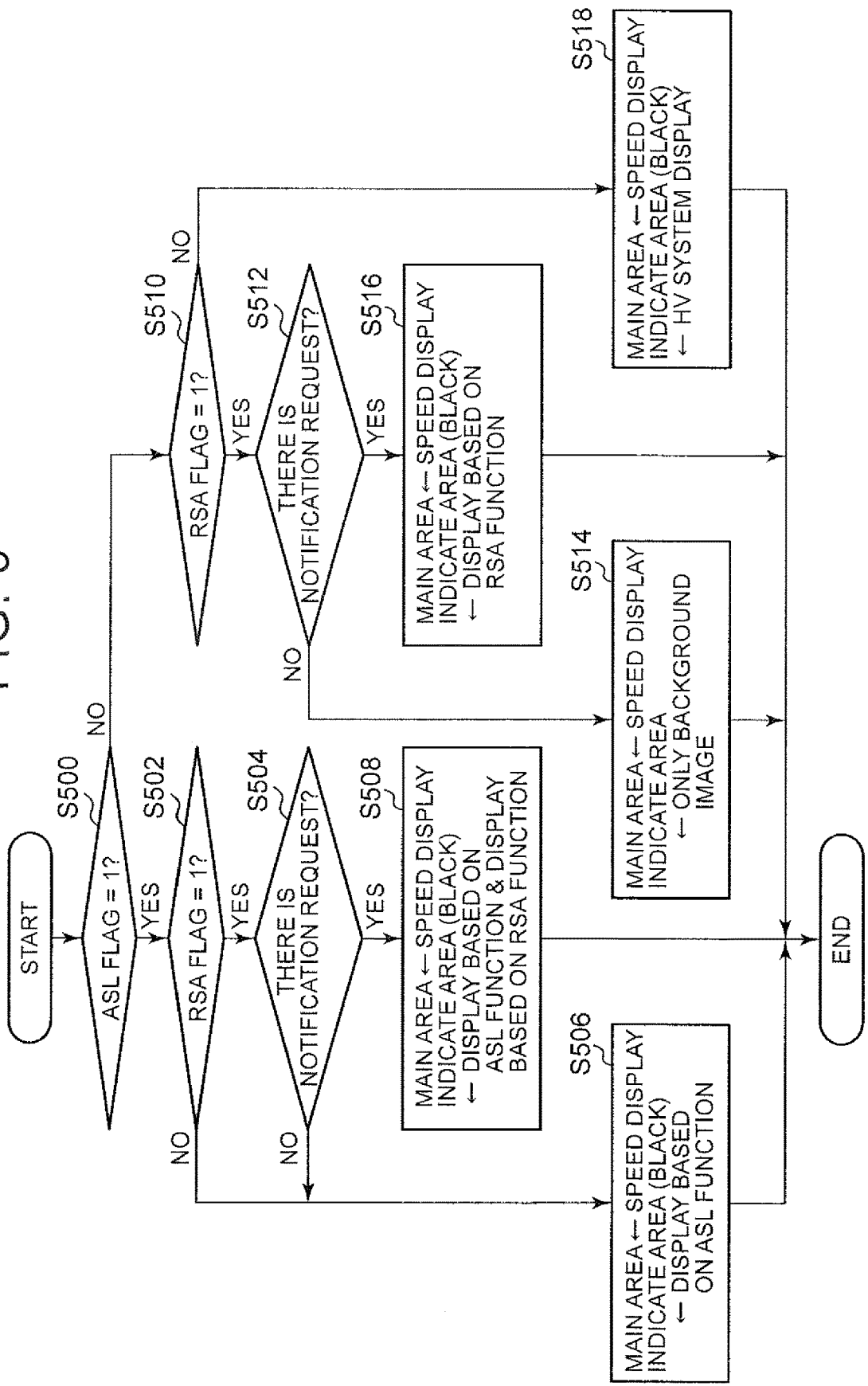
FIG. 5 is a flowchart schematically showing an example of the flow of an operation of the meter ECU 7.

FIG. 5 is a flowchart schematically showing an example of the flow of an operation of the meter ECU 7. Processing shown in FIG. 5 is repeatedly executed at each predetermined period. FIGS. 6A to 6E are diagrams showing a display screen example of the display device 42.

In Step S500, the determination unit 75 determines whether or not the ASL flag is "1". The state of the ASL flag can be determined based on information which can be acquired from the ASL ECU 43 through the CAN bus 30. In a case where the determination result is "YES", the process progresses to Step S502, and otherwise, the process progresses to Step S510.

In Step S502, the determination unit 75 determines whether or not the RSA flag is "1". The state of the RSA flag can be determined based on information which can be acquired from the RSA ECU 41 through the CAN bus 30. In a case where the determination result is "YES", the process progresses to Step S504, and otherwise, the process progresses to Step S506.

In Step S504, the determination unit 75 determines whether or not a notification request is generated. The notification request can be acquired from the RSA ECU 41 through the CAN bus 30. In a case where the determination result is "YES", the process progresses to Step S508, and otherwise, the process progresses to Step S506.

Figure 6A:
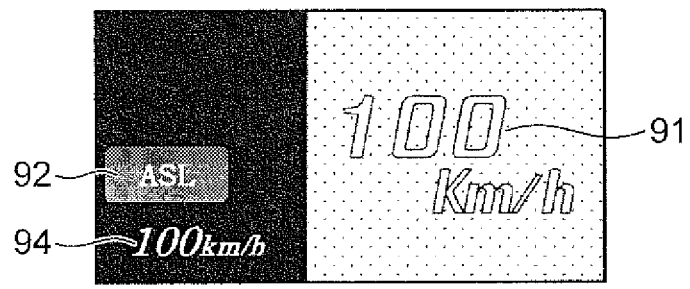
FIG. 6A is a diagram showing a display screen example of the display device 42 according to Example 1.

In Step S506, as shown in FIG. 6A, the third information notification unit 79 outputs speed display 91 (for example, 100 km/h) representing a current vehicle speed to the main area 80. A background image of the main area 80 has a color other than black as a primary color. As shown in FIG. 6A, the third information notification unit 79 outputs display 92 representing the ASL function being in the on state and display 94 representing an upper limit speed set with the ASL function to the indicate area 82 while making the indicate area 82 black. With this, the driver can ascertain that the ASL function is in the on state and can ascertain the upper limit speed. The indicate area 82 is made black, and the background image of the main area 80 has a color other than black as a primary color, whereby it is possible to strength contrast between the indicate area 82 and the main area 80 and to increase visibility of information displayed in the indicate area 82.

Figure 6B:
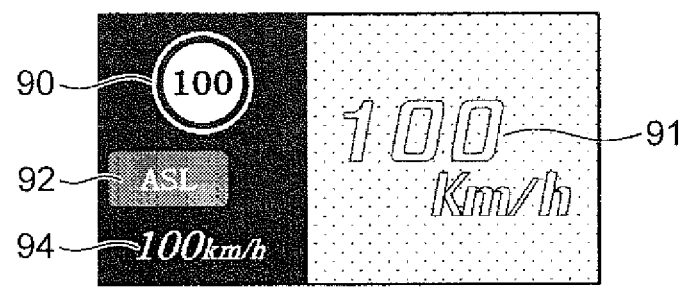
FIG. 6B is a diagram showing a display screen example of the display device 42 according to Example 1.

In Step S508, as shown in FIG. 6B, the third information notification unit 79 outputs the speed display 91 to the main area 80. As shown in FIG. 6B, the third information notification unit 79 outputs the display 92 representing the ASL function being in the on state and the display 94 representing the upper limit speed with the ASL function to the indicate area 82 while making the indicate area 82 black. With this, the driver can ascertain that the ASL function is in the on state and can ascertain the upper limit speed. In addition, as shown in FIG. 6B, the third information notification unit 79 outputs sign display 90 according to the notification request by the RSA function to the indicate area 82. The sign display 90 represents a road sign recognized based on the RSA function. In the example shown in FIG. 6B, the sign display 90 is display representing a road sign including a limit speed. With this, the driver can ascertain the limit speed by the RSA function.

In Step S510, the determination unit 75 determines whether or not the RSA flag is "1". In a case where the determination result is "YES", the process progresses to Step S512, and otherwise, the process progresses to Step S518.

In Step S512, the determination unit 75 determines whether or not a notification request is generated. In a case where the determination result is "YES", the process progresses to Step S516, and otherwise, the process progresses to Step S514.

Figure 6C:
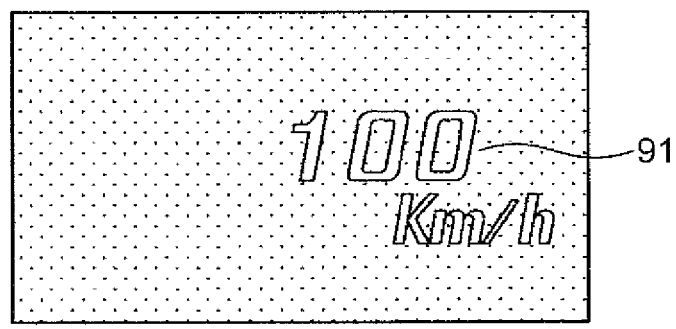
FIG. 6C is a diagram showing a display screen example of the display device 42 according to Example 1.

In Step S514, as shown in FIG. 6C, the first information notification unit 76 outputs the speed display 91 to the main area 80. As shown in FIG. 6C, the first information notification unit 76 outputs only the background image to the indicate area 82. Accordingly, changing information is not displayed in the indicate area 82. In the example shown in FIG. 6C, only the same background image as the background image of the main area 80 is output to the indicate area 82. A state where only the background image is output to the indicate area 82 means that the RSA function is in the on state, and this is preferably described in a manual. With this, the driver who views the display screen shown in FIG. 6C can ascertain that the RSA function is in the on state, but a road sign is not recognized.

Figure 6D:
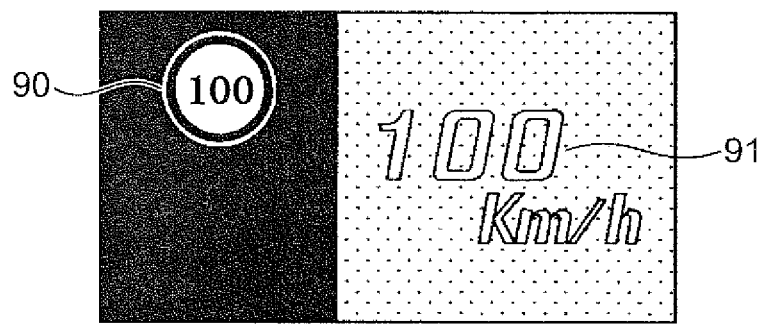
FIG. 6D is a diagram showing a display screen example of the display device 42 according to Example 1.

In Step S516, as shown in FIG. 6D, the first information notification unit 76 outputs the speed display 91 to the main area 80. As shown in FIG. 6D, the first information notification unit 76 outputs the sign display 90 according to the notification request to the indicate area 82 while making the indicate area 82 black. In the example shown in FIG. 6D, the sign display 90 is display representing a road sign including a limit speed. With this, the driver can ascertain the limit speed by the RSA function.

Figure 6E:
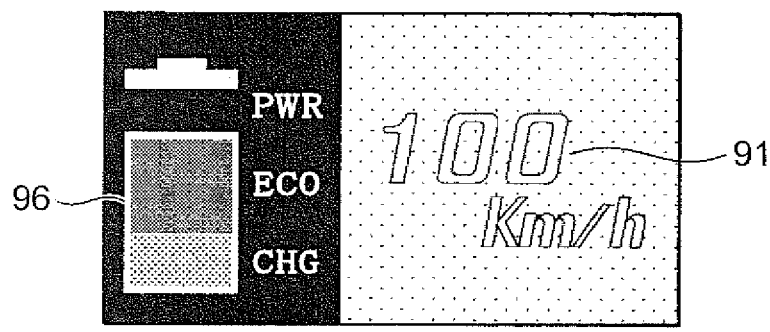
FIG. 6E is a diagram showing a display screen example of the display device 42 according to Example 1.

In Step S518, as shown in FIG. 6E, the second information notification unit 78 outputs the speed display 91 to the main area 80. The second information notification unit 78 acquires predetermined information different from information notified by the RSA function. The predetermined information is information indicating a state of a hybrid vehicle (HV) system and can be acquired through the CAN bus 30. For example, the predetermined information can be acquired based on information from an ECU (not shown) of the HV system. As shown in FIG. 6E, the second information notification unit 78 outputs display 96 (in the example shown in FIG. 6E, indicator display of the HV system) for giving notification of the predetermined information to the indicate area 82 while making the indicate area 82 black. With this, the driver can ascertain that the RSA function is in the off state and can acquire the predetermined information different from information notified by the RSA function through the indicate area 82. In the example shown in FIG. 6E, the predetermined information is the state of the hybrid system, but is not limited thereto. For example, the predetermined information may be, for example, instantaneous fuel efficiency, the state of charge (SOC) of a battery, or the like. The display 96 for giving notification of the predetermined information is display which has an attribute different from the sign display 90. Specifically, while the display 96 is display in which constant display is suitably performed when an ignition switch is turned on (when the RSA function is in the off state), as described above, the sign display 90 is not a type of display in which constant display is performed when the ignition switch is turned on (when the RSA function is in the on state).

According to Example 1, since a mechanism which can turn off the RSA function as an example of the notification function is provided, it is possible to realize a system with consideration for a vehicle occupant (in particular, driver) who feels bothersome with the notification function. According to Example 1, since the display 96 can be output through the indicate area 82 when the RSA function is in the off state, it is possible to perform efficient information provision to the vehicle occupant through the limited display area of the display device 42. That is, according to Example 1, it is possible to enable selectively turning on/off the RSA function according to an input from the vehicle occupant and to perform new information provision to the vehicle occupant through the indicate area 82 when the RSA function is in the off state.

Example 2

Figure 7:
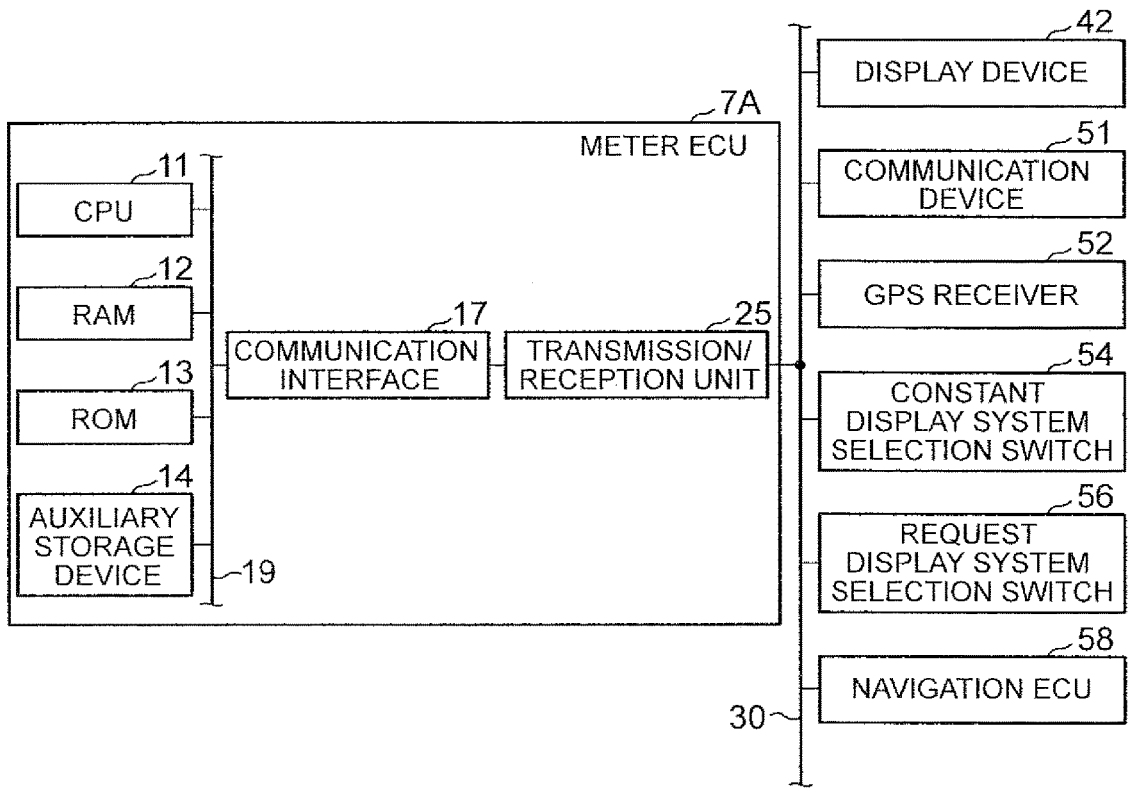
FIG. 7 is a diagram showing an example of a vehicle system which relates to a driving assistance apparatus according to Example 2.

FIG. 7 is a diagram showing an example of a vehicle system which relates to a driving assistance apparatus according to Example 2. In FIG. 7, the hardware configuration of a meter ECU 7A is also shown. In FIG. 7, the meter ECU 7A and a navigation ECU 58 form a driving assistance apparatus.

The same constituent elements as those in Example 1 described above are represented by the same reference numerals in FIG. 7, and description thereof will not be repeated.

The vehicle system shown in FIG. 7 includes the meter ECU 7A. The meter ECU 7A, a display device 42, a communication device 51, a global positioning system (GPS) receiver 52, a constant display system selection switch 54, a request display system selection switch 56, the navigation ECU 58, and the like are connected to a CAN bus 30.

The meter ECU 7A controls display of the display device 42 in a meter disposed on an instrument panel.

The communication device 51 performs communication with a road-side apparatus (not shown) around the vehicle.

The GPS receiver 52 measures the host vehicle position based on radio waves from GPS satellites.

The constant display system selection switch 54 is operated by the vehicle occupant. The constant display system selection switch 54 is operated to an on position when turning on a constant display function and is operated to an off position when turning off the constant display function.

The request display system selection switch 56 is operated by the vehicle occupant. The request display system selection switch 56 is operated to an on position when turning on a request display function and is operated to an off position when turning off the request display function.

The navigation ECU 58 realizes a navigation function based on information from the GPS receiver 52 or map information. The navigation ECU 58 executes processing related to the constant display function and the request display function as described below.

Figure 8A:
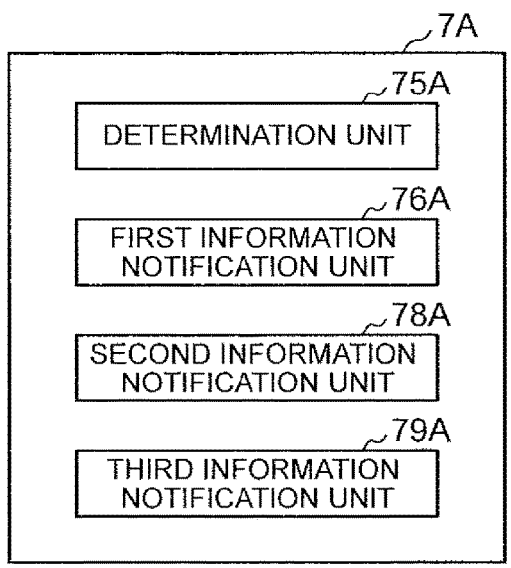
FIG. 8A is a functional block diagram of a meter ECU 7A.
Figure 8B:
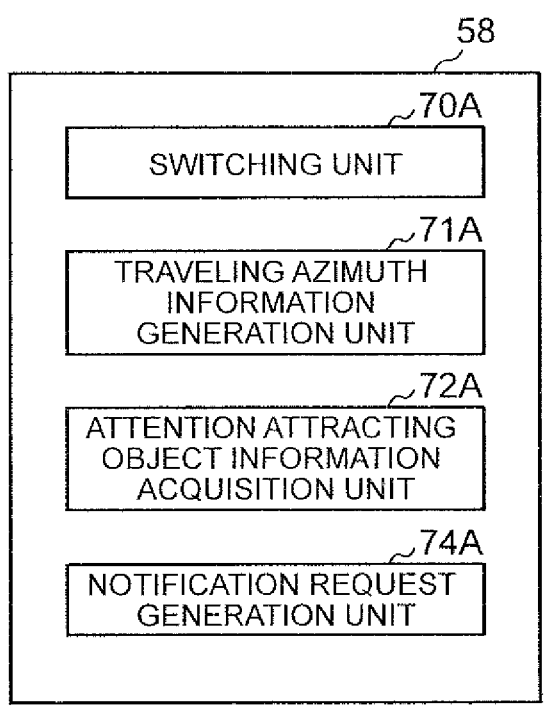
FIG. 8B is a functional block diagram of a navigation ECU.

FIG. 8A is a functional block diagram of the meter ECU 7A. FIG. 8B is a functional block diagram of the navigation ECU 58.

As shown in FIG. 8A, the meter ECU 7A includes a determination unit 75A, a first information notification unit 76A, a second information notification unit 78A, and a third information notification unit 79A. The determination unit 75A, the first information notification unit 76A, the second information notification unit 78A, and the third information notification unit 79A can be realized by a CPU 11 executing one or more programs in a RUM 13. The functions of the determination unit 75A, the first information notification unit 76A, the second information notification unit 78A, and the third information notification unit 79A will be described below referring to FIG. 10.

As shown in FIG. 8B, the navigation ECU 58 includes a switching unit 70A, a traveling azimuth information generation unit 71A, an attention attracting object information acquisition unit 72A, and a notification request generation unit 74A. The switching unit 70A, the traveling azimuth information generation unit 71A, the attention attracting object information acquisition unit 72A, and the notification request generation unit 74A can be realized by a CPU of the navigation ECU 58 executing one or more programs in a ROM.

The switching unit 70A switches the on/off state of the constant display function according to an input from the constant display system selection switch 54. In this example, the switching unit 70A sets a constant display function flag to "1" when turning on the constant display function and sets the constant display function flag to "0" when turning off the constant display function.

The traveling azimuth information generation unit 71A generates a signal indicating a traveling azimuth based on information from the GPS receiver 52 constantly when the constant display function is in the on state. The navigation ECU 58 passes the generated signal to the CAN bus 30.

The switching unit 70A switches the on/off state of the request display function according to an input from the request display system selection switch 56. In this example, the switching unit 70A sets a request display function flag to "1" when turning on the request display function and sets the request display function flag to "0" when turning off the request display function.

The attention attracting object information acquisition unit 72A acquires attention attracting object information (another example of external information) relating to an attention attracting object in front of the vehicle in the traveling direction through the communication device 51 when the request display function is in the on state. The attention attracting object is prescribed as an object on a road necessary for attracting the attention of the vehicle occupant (in particular, driver). The attention attracting object information includes the attribute (falling object, construction vehicle, accident involved vehicle, or the like) of the attention attracting object and the position of the attention attracting object.

The notification request generation unit 74A generates a notification request for giving notification of information by the request display function based on the attention attracting object information acquired by the attention attracting object information acquisition unit 72A. A signal related to the notification request includes information representing the attribute of the attention attracting object.

Figure 9:
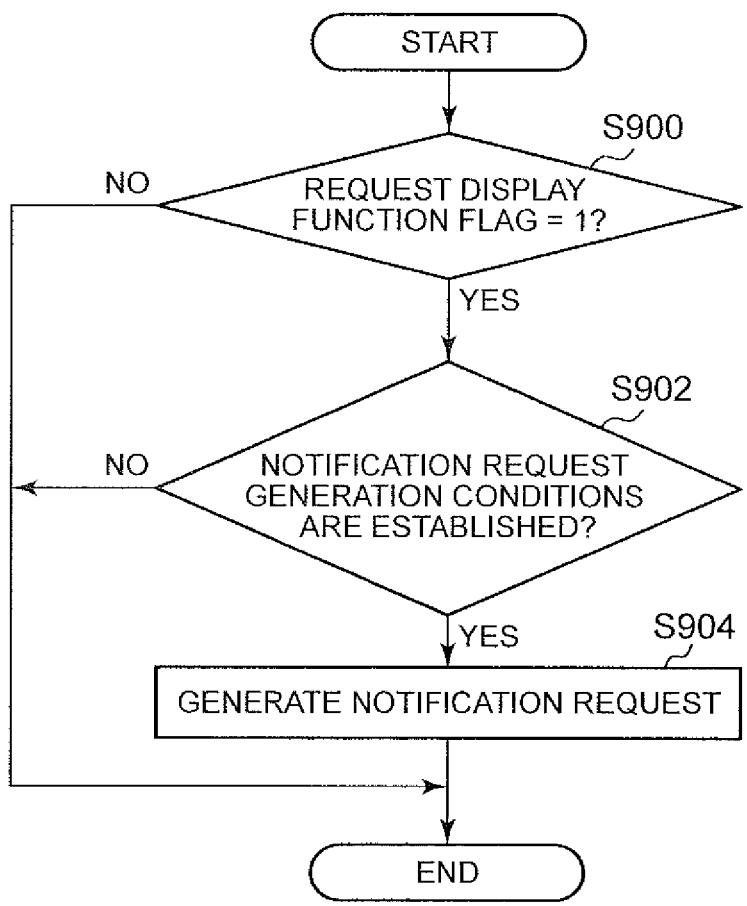
FIG. 9 is a flowchart schematically showing an example of the flow of an operation of the navigation ECU.

FIG. 9 is a flowchart schematically showing an example of the flow of an operation of the notification request generation unit 74A of the navigation ECU 58. Processing shown in FIG. 9 is repeatedly executed at each predetermined period.

In Step S900, the notification request generation unit 74A determines whether or not the request display function flag is "1". In a case where the determination result is "YES", the process progresses to Step S902, and otherwise, the process ends.

In Step S902, the notification request generation unit 74A determines whether or not the notification request generation conditions are satisfied. The notification request generation conditions are satisfied, for example, in a case where any one of (21) and (22) is satisfied: (21) the attention attracting object information acquisition unit 72A acquires the attention attracting object information through the communication device 51, and (22) notification request end conditions are not satisfied after the attention attracting object information has been acquired (that is, after the condition (21) has been established). The notification request end conditions in the condition. (22) are, for example, that "the vehicle passes through a position of the attention attracting object indicated by the attention attracting object information".

In Step S902, in a case where the determination result is "YES", the process progresses to Step S904, and otherwise, the process ends.

In Step S904, the notification request generation unit 74A generates a notification request for giving notification of information by the request display function and passes the generated notification request to the CAN bus 30.

Figure 10:
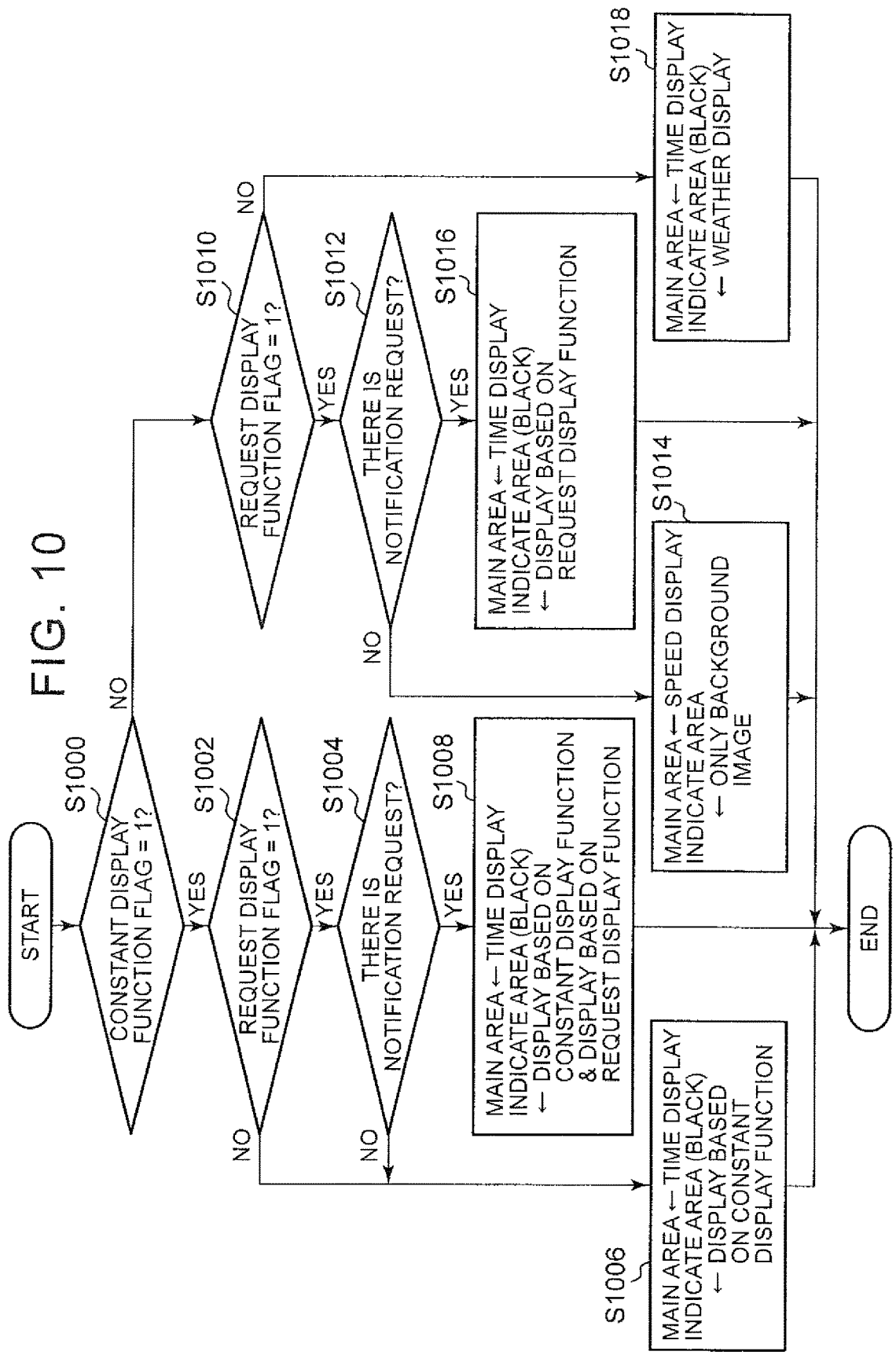
FIG. 10 is a flowchart schematically showing an example of the flow of an operation of the meter ECU 7A.

FIG. 10 is a flowchart schematically showing an example of the flow of an operation of the meter ECU 7A. Processing shown in FIG. 10 is repeatedly executed at each predetermined period. FIGS. 11A to 11E are diagrams showing a display screen example of the display device 42.

In Step S1000, the determination unit 75A determines whether or not the constant display function flag is "1". The state of the constant display function flag can be determined based on information which can be acquired from the navigation ECU 58 through the CAN bus 30. In a case where the determination result is "YES", the process progresses to Step S1002, and otherwise, the process progresses to Step S1010.

In Step S1002, the determination unit 75A determines whether or not the request display function flag is "1". The state of the request display function flag can be determined based on information which can be acquired from the navigation ECU 58 through the CAN bus 30. In a case where the determination result is "YES", the process progresses to Step S1004, and otherwise, the process progresses to Step S1006.

In Step S1004, the determination unit 75A determines whether or not a notification request is generated. The notification request can be acquired from the navigation ECU 58 through the CAN bus 30. In a case where the determination result is "YES", the process progresses to Step S1008, and otherwise, the process progresses to Step S1006.

Figure 11A:
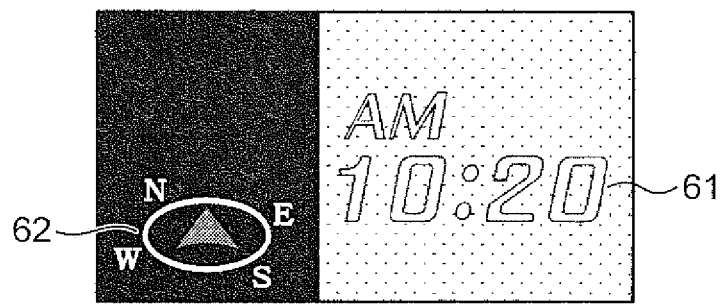
FIG. 11A is a diagram showing a display screen example of the display device 42 according to Example 2.

In Step S1006, as shown in FIG. 11A, the third information notification unit 79A outputs, for example, timepiece display 61 (in the example of the drawing, 10:20 a.m.) representing a current time to the main area 80. A background image of the main area 80 has a color other than black as a primary color. As shown in FIG. 11A, the third information notification unit 79A outputs display 62 (an example of display based on the constant display function) representing the traveling azimuth of the vehicle to the indicate area 82 based on the signal from the traveling azimuth information generation unit 71A while making the indicate area 82 black. With this, the driver can ascertain that the constant display function is in the on state and can ascertain the traveling azimuth of the vehicle.

Figure 11B:
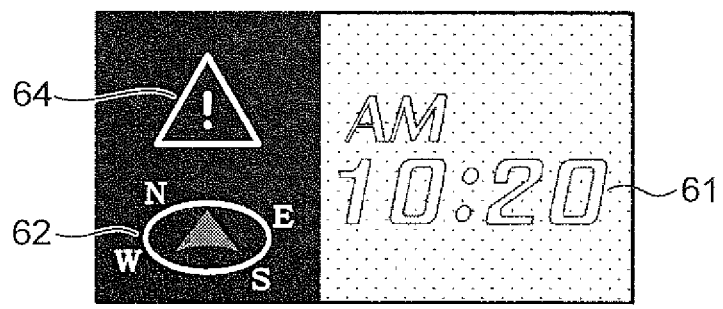
FIG. 11B is a diagram showing a display screen example of the display device 42 according to Example 2.

In Step S1008, as shown in FIG. 11B, the third information notification unit 79A outputs the timepiece display 61 to the main area 80. As shown in FIG. 11B, the third information notification unit 79A outputs the display 62 representing the traveling azimuth of the vehicle to the indicate area 82 based on the signal from the traveling azimuth information generation unit 71A while making the indicate area 82 black. With this, the driver can ascertain that the constant display function is in the on state and can ascertain the traveling azimuth of the vehicle. As shown in FIG. 11B, the third information notification unit 79A outputs attention attracting object display 64 (an example display based on the request display function) according to the notification request to the indicate area 82. With this, the driver can ascertain the presence of the attention attracting object by the request display function.

In Step S1010, the determination unit 75A determines whether or not the request display function flag is "1". In a case where the determination result is "YES", the process progresses to Step S1012, and otherwise, the process progresses to Step S1018.

In Step S1012, the determination unit 75A determines whether or not a notification request is generated. In a case where the determination result is "YES", the process progresses to Step S1016, and otherwise, the process progresses to Step S1014.

Figure 11C:
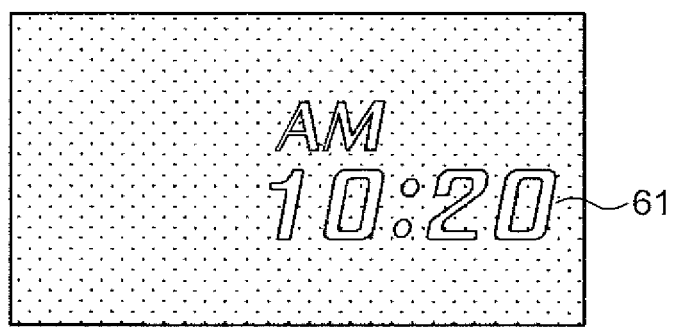
FIG. 11C is a diagram showing a display screen example of the display device 42 according to Example 2.

In Step S1014, as shown in FIG. 11C, the first information notification unit 76A outputs the timepiece display 61 to the main area 80. As shown in FIG. 11C, the first information notification unit 76A outputs only the background image to the indicate area 82. Accordingly, changing information is not displayed in the indicate area 82. In the example shown in FIG. 11C, only the same background image as the background image of the main area 80 is output to the indicate area 82. A state where only the background image is output to the indicate area 82 means that the request display function is in the on state, and this is described in the manual. With this, the driver who views the display screen shown in FIG. 11C can ascertain that the request display function is in the on state, but an attention attracting object is not detected.

Figure 11D:
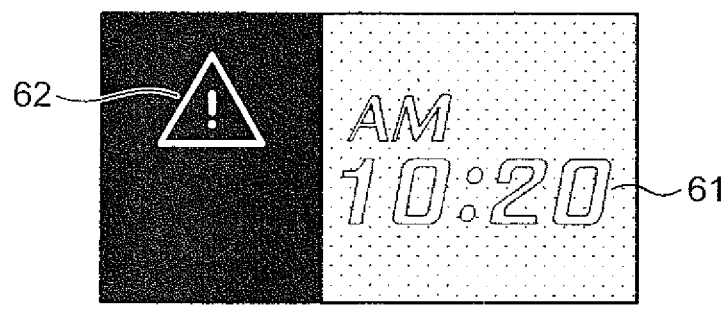
FIG. 11D is a diagram showing a display screen example of the display device 42 according to Example 2.

In Step S1016, as shown in FIG. 11D, the first information notification unit 76A outputs the timepiece display 61 to the main area 80. As shown in FIG. 11D, the first information notification unit 76A outputs the attention attracting object display 64 according to the notification request to the indicate area 82 while making the indicate area 82 black. With this, the driver can ascertain the presence of the attention attracting object by the request display function.

Figure 11E:
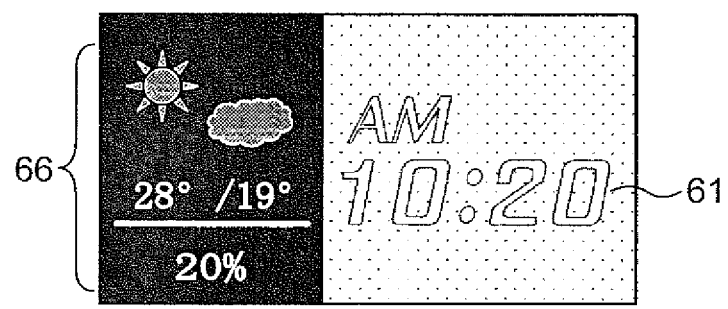
FIG. 11E is a diagram showing a display screen example of the display device 42 according to Example 2.

In Step S1018, as shown in FIG. 11E, the second information notification unit 78A outputs the timepiece display 61 to the main area 80. The second information notification unit 78A acquires predetermined information different from information notified by the request display function. The predetermined information is weather information and can be acquired through the CAN bus 30. For example, the predetermined information can be acquired based on information from a sunshine sensor, a temperature and humidity sensor (not shown), or the like. As shown in FIG. 11E, the second information notification unit 78A outputs display 66 (in the example shown in FIG. 11E, display relating to weather) for giving notification of the predetermined information to the indicate area 82 while making the indicate area 82 black. With this, the driver can ascertain that the request display function is in the off state and can acquire the predetermined information different from information notified by the request display function through the indicate area 82. In the example shown in FIG. 11E, the predetermined information is information relating to weather, but the disclosure is not limited thereto. For example, the predetermined information may be instantaneous fuel efficiency or the SOC of the battery. As in Example 1 described above, the display 66 for giving notification of the predetermined information is display which has an attribute different from the attention attracting object display 64. Specifically, while the display 66 is display in which constant display is suitably performed when an ignition switch is turned on (when the request display function is in the off state), as described above, the attention attracting object display 64 is not a type of display in which constant display is performed when the ignition switch is turned on (when the request display function is in the on state).

According to Example 2, since a mechanism which can turn off the request display function as an example of the notification function is provided, it is possible to realize a system with consideration for a vehicle occupant (for example, driver) who feels bothersome with the notification function. According to Example 2, since the display 66 can be output through the indicate area 82 when the request display function is in the off state, it is possible to perform efficient information provision to the vehicle occupant through the limited display area of the display device 42. That is, according to Example 2, it is possible to enable selectively turning on/off the request display function according to an input from the vehicle occupant and to perform new information provision to the vehicle occupant through the indicate area 82 when the request display function is in the off state.

Although the preferred example of the disclosure has been described in detail, the disclosure is not limited to the above-described examples, various modification and substitutions can be applied to the above-described examples without departing from the scope of the disclosure.

For example, in Example 1 and Example 2 described above, although the display device 42 is a display in the meter, the disclosure is not limited thereto. For example, the display device 42 may be a head-up display.

In regard to the processing of FIG. 5 in Example 1 described above, in a case where the determination result of Step S512 is "NO", the process may progress to Step S518. In such a modification example, in Step S514, another information display (that is, display 96) different from the sign display 90 is output to the indicate area 82, instead of the background image. However, Example 1 described above is more preferable than this modification example from the following point. Specifically, in this modification example, when the sign display 90 is turned on or off based on the presence or absence of the generation of the notification request, switching of information display between the sign display 90 and the display 96 is repeated. The driver may feel a sense of discomfort due to such switching. In contrast, in Example 1 described above, in Step S514, since only the background image is output to the indicate area 82, when the sign display 90 is turned on or off based on the presence or absence of the generation of the notification request, it should suffice that the presence or absence of superimposition of the sign display 90 on the same background image is switched, and it is possible to suppress a possibility of giving the driver a sense of discomfort.

Similarly, in regard to the processing of FIG. 11 in Example 2 described above, in a case where the determination result of Step S1012 is "NO", the process may progress to Step S1018.

In Example 1 described above, the configuration which relates to the ASL function may be omitted. In this case, in the processing of FIG. 5, the processing of Steps S500 to S508 is omitted. That is, this is equivalent to a state where the determination result of Step S500 is constantly "NO". Similarly, in Example 2 described above, the configuration which relates to the constant display function may be omitted.

What is claimed is:

1. A driving assistance apparatus comprising:
   a notification request generation unit configured to generate a notification request based on external information relating to attention attracting objects or road signs outside a vehicle;
   a switching unit configured to switch between an on state and an off state of a notification function according to an input from an occupant of the vehicle;
   a first information notification unit configured to:
      display, based on the notification request, a first display in a first display area of a display device, the display device being mounted in the vehicle, the first display being for giving notification of the external information, in a case where the notification function is in the on state and the notification request is generated,
      display, based on the notification request, a second display in a second display area of the display device, the second display area being different from the first display area, the second display being related to a traveling state of the vehicle, in a case where the notification function is in the on state and the notification request is generated;
      display only a background image in the first display area in a case where the notification function is in the on state and the notification request is not generated; and
   a second information notification unit configured to display a third display for giving notification of predetermined information different from the external information in the first display area in a case where the notification function is in the off state.

2. The driving assistance apparatus according to claim 1, wherein the notification function is a road sign assist function.

3. The driving assistance apparatus according to claim 1, wherein the notification request generation unit determines whether or not notification request generation conditions are satisfied based on image data, and
   the notification request generation conditions are satisfied in a case where any one of i) and ii) is satisfied: i) a predetermined road sign to be notified is recognized based on image data, and ii) notification request end conditions are not satisfied after the predetermined road sign to be notified has been recognized.

4. The driving assistance apparatus according to claim 3, wherein the notification request end conditions are satisfied in a case where any one of conditions i) to v) is satisfied: i) a road on which a host vehicle is traveling is changed from a road in which a predetermined road sign to be notified has been recognized, ii) a predetermined time has elapsed after the predetermined road sign to be notified has been recognized, iii) the host vehicle travels a predetermined distance after the predetermined road sign to be notified has been recognized, iv) the host vehicle changes a lane from a lane in which the predetermined road sign to be notified has been recognized, and v) another new predetermined road sign to be notified is recognized.

5. The driving assistance apparatus according to claim 1, further comprising:
   a third information notification unit configured to display an adjustable speed limiter function being in an on state in the first display area of the display device.

6. The driving assistance apparatus according to claim 1, further comprising:
   a meter electronic control unit; and
   a road sign assist electronic control unit.

7. The driving assistance apparatus according to claim 1, wherein the notification request generation unit determines whether or not notification request generation conditions are satisfied, and
   the notification request generation conditions are satisfied in a case where any one of i) and ii) is satisfied: i) an attention attracting object information acquisition unit acquires attention attracting object information through a communication device, and ii) notification request end conditions are not satisfied after the attention attracting object information has been acquired.

8. The driving assistance apparatus according to claim 7, wherein the notification request end conditions are that the vehicle passes through a position of the attention attracting object indicated by the attention attracting object information.

9. The driving assistance apparatus according to claim 1, further comprising:
   a third information notification unit configured to display a constant display function being in an on state in the first display area of the display device.

10. The driving assistance apparatus according to claim 9, wherein the constant display function is a function of outputting display representing a traveling azimuth of the vehicle.

11. The driving assistance apparatus according to claim 1, further comprising:
    a meter electronic control unit; and
    a navigation electronic control unit.

12. The driving assistance apparatus according to claim 1, wherein the second display indicates a vehicle speed.

\* \* \* \* \*